(12) United States Patent
Strife et al.

(10) Patent No.: US 6,426,968 B1
(45) Date of Patent: Jul. 30, 2002

(54) HYBRID OPTICAL MIRROR

(75) Inventors: James R. Strife, South Windsor, CT (US); John A. Dye, Lake Park; Warren R. Sigman, North Palm Beach, both of FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 06/374,679

(22) Filed: May 4, 1982

(51) Int. Cl.[7] .............................. H01S 3/081; G02B 5/08
(52) U.S. Cl. ...................... 372/99; 372/35; 372/107; 264/1.9
(58) Field of Search ............................ 372/35, 107, 99; 350/310, 320, 288; 264/1.2, 1.9; 75/230; 427/167

(56) References Cited

U.S. PATENT DOCUMENTS

| | | | | |
|---|---|---|---|---|
| 4,142,006 A | * | 2/1979 | Choyke et al. ............. 350/320 |
| 4,314,742 A | * | 2/1982 | Dye et al. .................... 350/310 |
| 4,340,969 A | * | 7/1982 | Hamilton et al. ............. 372/99 |
| 4,378,626 A | * | 4/1983 | Eitel ............................ 29/727 |
| 4,388,344 A | * | 6/1983 | Shuskus et al. ............. 350/310 |
| 4,408,833 A | * | 10/1983 | Gowar ....................... 350/320 |
| 4,444,467 A | * | 4/1984 | Shuskus et al. ............. 350/310 |

FOREIGN PATENT DOCUMENTS

FR  2285620  *  8/1975  ................. 350/610

OTHER PUBLICATIONS

Choyke et al, "Si C, A New . . . Applications", 9/76, pp 2006–7, Appl. Opt. vol. 15, #9, 372/99.*

* cited by examiner

Primary Examiner—Nelson Moskowitz

(57) ABSTRACT

A hybrid mirror for reflecting high power optical beams comprises a reaction sintered silicon carbide substrate to which is bonded a plurality of silicon faceplates containing a plurality of coolant passages.

4 Claims, 1 Drawing Sheet

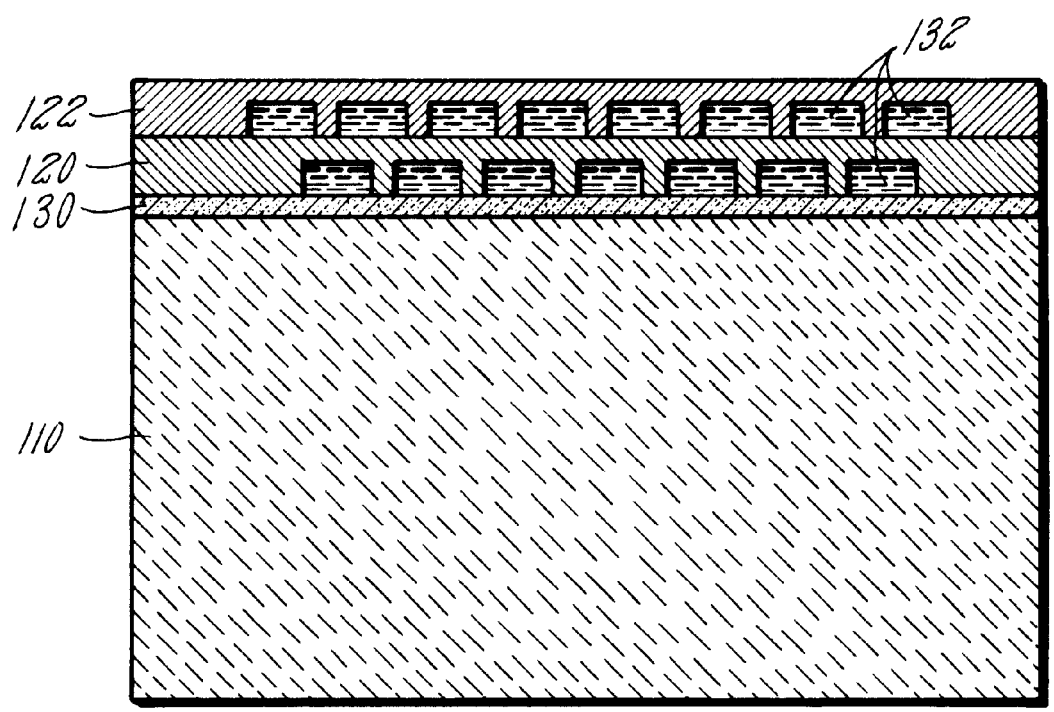

HYBRID OPTICAL MIRROR

TECHNICAL FIELD

The field of the invention is that of cooled optical mirrors.

BACKGROUND ART

In the field of cooled mirrors for high-power lasers and optical systems, the state of the art has changed from copper mirrors to molybdenum and from single-pass cooling to multiple layers of coolant channels.

Prior art mirrors have been fabricated with faceplate, heat exchangers and substrate of the same material for the obvious reason that differential expansion increases the distortion of the mirrors. The change from copper to molybdenum produced a better compromise between a high coefficient of thermal conductivity and a low coefficient of thermal expansion, at the cost of tackling the problems of working with molybdenum.

Work with different forms of heat exchangers has shown that state of the art molybdenum mirrors offer rapidly diminishing returns in that faceplate distortion decreases only slowly as cooling capacity increases. It is evident to those skilled in the art that future requirements for high flux, highly cooled mirrors that have extremely low distortion cannot be met by further refinements of present molybdenum mirrors. For the particular case of a laser operating in space, where the distortion requirements are more severe than for typical earth-based applications and where there is an added weight requirement, molybdenum mirrors are even less capable of meeting the system requirements.

Those skilled in the art have long sought an improved material for high-power mirrors, one approach being that disclosed in U.S. Pat. Nos. 4,142,006 and 4,214,818 issued to W. J. Choyke and R. A. Hoffman, showing the use of a hot-pressed silicon carbide mirror, in which the optical surface is either polished onto the substrate or is polished onto a vapor deposited layer of silicon carbide. These mirrors have the advantage that using the same material for the substrate and the faceplate reduced optical distortions caused by dissimilar thermal expansion. They also have the advantage that silicon carbide has less than one-third the density of molybdenum. These mirrors suffer a disadvantage, however, in that the thermal conductivity of silicon carbide is less than molybdenum.

DISCLOSURE OF INVENTION

The invention relates to a lightweight mirror for reflecting high power optical beams comprising a reaction sintered silicon carbide substrate supporting a faceplate formed by one or more plates of silicon containing coolant passages therein.

BRIEF DESCRIPTION OF DRAWING

FIG. 1 illustrates an embodiment of the invention.

BEST MODE FOR CARRYING OUT THE INVENTION

When a high power optical beam is reflected off a mirror, the nonuniform energy flux in the beam generates heat at the mirror surface which is of different magnitude in different regions of the mirror. The mirror absorbs the heat and then expands at a different rate in different areas, resulting in a distortion of the mirror shape. It has long been a key problem in the art of designing laser mirrors to reduce the distortion produced under beam load.

The standard combination of materials in the prior art has been a molybdenum faceplate containing passages for flowing coolant material, bonded to a molybdenum substrate, molybdenum having the best combination of thermal conductivity to conduct heat away from the reflective surface combined with sufficient rigidity of the substrate to resist thermal bending under beam loading.

FIG. 1 illustrates an embodiment of the invention in which substrate 110 is formed from reaction sintered silicon carbide containing 5–25% free silicon. This substrate is bonded to a faceplate package consisting of a manifold plate 130, and faceplates 120 and 122, the uppermost surface of faceplate 122 being polished to an optical finish. Faceplates 120 and 122 are plates of crystalline silicon which are sliced from an ingot, lap ground to appropriate flatness, and polished to a damage free surface condition. The silicon plates 120 and 122 have a number of coolant passages 132 machined therein by chemical etching, ultrasonic machining or a combination thereof. The cooling passages will typically be semicircular or rectangular in shape with a depth of 0.030 in. in a plate which is 0.045 in. thick. The lands between adjacent cooling passages are typically 0.015 in. wide. Plate 130 is a manifold plate composed of crystalline silicon prepared as described previously with entry ports machined so as to introduce coolant to the faceplate. Manifold plate 130 is typically 0.015 in. thick.

Silicon faceplates 120 and 122, and silicon manifold plate 130 are bonded together metallurgically by placing gold foil at the plate interfaces and heating the assembly in vacuum at a temperature between 400° C. and 1200° C. When using suitable bonding parameters, the gold will alloy with silicon and diffuse away from the interface to the extent that a regrowth layer of silicon will crystallize epitaxially at the interface resulting in a bond joint of strength equivalent to the silicon substrates. Typical conditions for successful bonding are 60 min. at 1100° C. An identical bonding process may also be utilized to bond the remaining face of the silicon manifold plate 130 to a reaction sintered silicon carbide substrate 110, since the substrate contains free silicon which will likewise alloy with gold and result in crystallization of a regrowth layer of silicon at the interface.

When SiC is reaction sintered, a "skeleton" of SiC is formed with free silicon interspersed through it. The bonding agent, gold or aluminum, penetrates through the skeleton to alloy with the free silicon. A material such as SiC hot-pressed to 99% of theoretical density would not be a suitable material because it would not have the free silicon available.

The use of gold is not essential, and other materials, such as aluminum, may be used.

State-of-the-art mirrors are produced from molybdenum substrates and faceplates, since molybdenum has the best combination of low coefficient of thermal expansion, high thermal conductivity and high elastic modulus, together with being less difficult to fabricate than alternative materials.

Those skilled in the art would not ordinarily think to combine different materials for the faceplate and substrate because it is well known that dissimilar coefficients of expansion will aggravate distortion and bonding problems. It is surprising, therefore, that detailed calculations of thermal loading effects have predicted a significant improvement in distortion for this hybrid mirror compared with molybdenum, for the same volume of coolant in a steady-state situation.

Silicon has an elastic modulus in the range of 19–27 Msi, with (111) oriented single crystal silicon having an elastic modulus of 24 Msi, compared with a value of 47 Msi for molybdenum. Reaction sintered SiC typically has an elastic modulus in the range of 45–55 Msi. The thermal bending moment of the entire mirror structure is reduced by having a low modulus faceplate on a higher modulus substrate or backup structure. Thus, though both Si and reaction-sintered SiC have elastic moduli no better than molybdenum, the combination described above offers significantly improved optical performance.

What is claimed is:

1. A cooled mirror comprising:
a ceramic substrate having a top surface and a faceplate bonded to said substrate, said faceplate comprising at least one silicon plate having a plurality of coolant passages therein, that surface of said faceplate farthest from said top surface of said substrate being polished to an optical finish, and said substrate is formed from siliconized silicon carbide containing between 5 and 25 per cent free silicon and that one of said at least one plate of silicon closest to said substrate is bonded to said substrate by a metal lurical bond.

2. A mirror according to either of claims 1, in which said faceplate and substrate are bonded metallurgically with a bonding metal at a temperature in excess of the bonding metal-silicon eutectic temperature.

3. A mirror according to claim 2, in which said bonding metal is gold.

4. A mirror according to claim 2, in which said bonding metal is aluminum.

* * * * *